Oct. 30, 1962   J. D. MITCHELL   3,060,844
HAY FLOW CONTROLLER
Filed Dec. 15, 1960   2 Sheets-Sheet 1

INVENTOR
John D Mitchell
by
ATTORNEYS

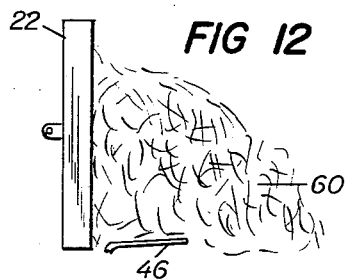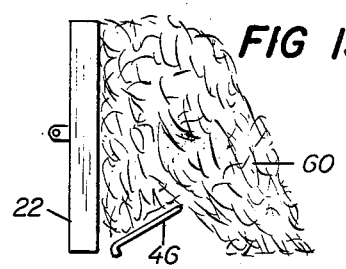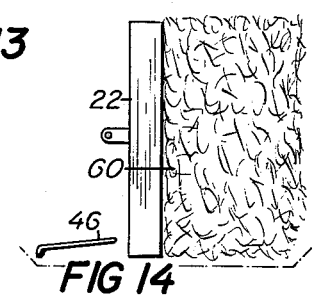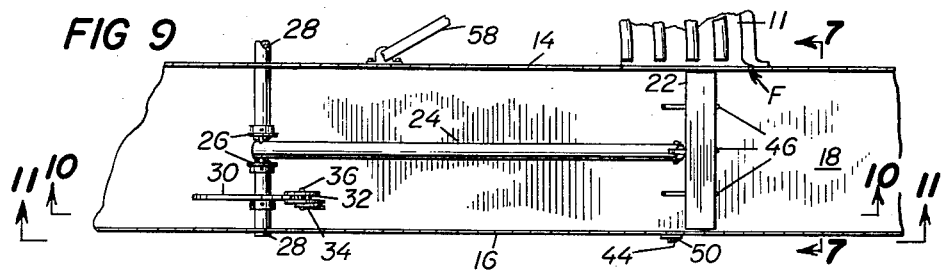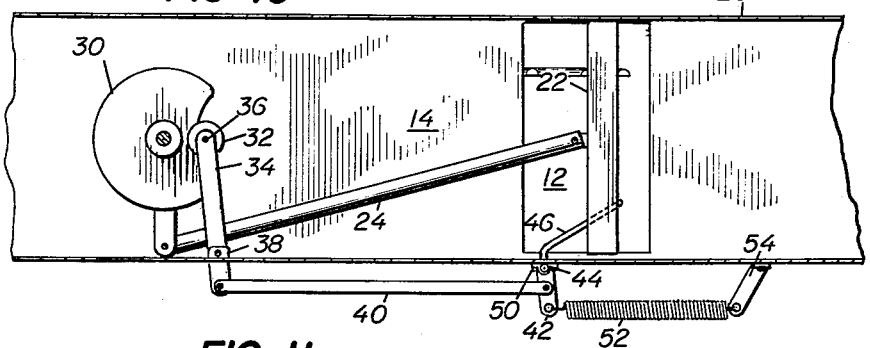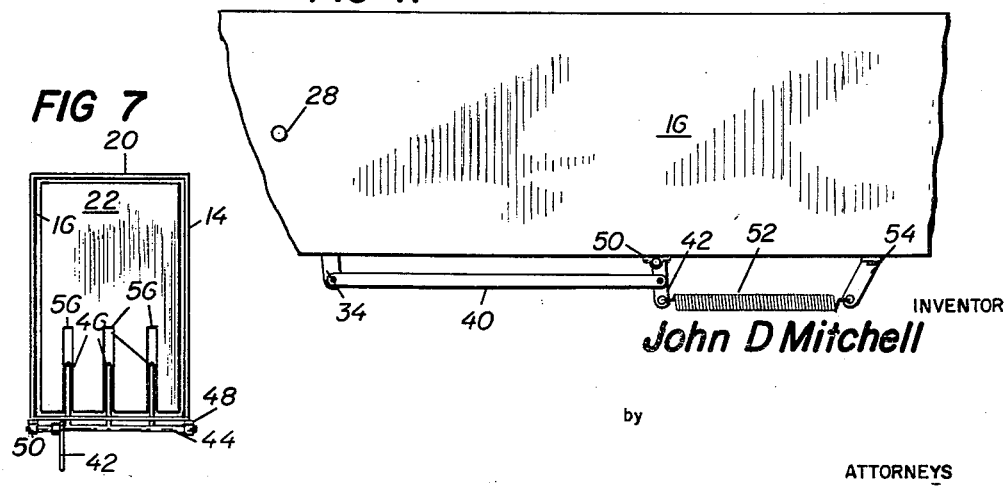

United States Patent Office 3,060,844
Patented Oct. 30, 1962

3,060,844
HAY FLOW CONTROLLER
John D. Mitchell, Woodville, N.C., assignor to Harrington Manufacturing Company, Inc., Lewiston, N.C., a company of North Carolina
Filed Dec. 15, 1960, Ser. No. 75,991
2 Claims. (Cl. 100—187)

This invention generally relates to an improved hay baling machine. More particularly this invention relates to an improved hay baling machine which has a hay baling chamber which is capable of operating under a great variety of adverse haying conditions without producing improperly shaped bales.

BACKGROUND

There are a number of known hay baling machines which are adapted to move through a field of mown hay and to ultimately form bales of hay. These hay baling machines comprise the following main sections:

(A) A pick-up section which is adapted to pick up the hay from the ground and deliver it to a feed surface;
(B) A feed surface leading to the baling chamber;
(C) A feeding means for moving the picked-up hay from the feed surface into a baling chamber;
(D) A baling chamber section; and
(E) Means for compressing the hay which is delivered to the baling chamber section.

In the table below are listed patents disclosing hay baling machines together with an indication of their relationship to the above-described features (A) through (E).

*Table I*

| Patent Number | A | B | C | D | E |
|---|---|---|---|---|---|
| 2,437,938 | 27 | 31 | 43 | 11 | 21 |
|  | 29 |  | 44 |  |  |
| 2,545,188 | 15 | 16 | 59 | 1 | 2 |
|  |  | 14 | 12 |  |  |
| 2,627,714 | 29 | 20 | 15 | 10 | 11 |
|  |  | 21 | 18 |  |  |
| 2,835,101 | 18 | 20 | 44 | 22 | 32 |
| 2,862,347 | 141 | 160 | 190 | 100 | 110 |
|  |  | 176 | 205 | 95 |  |
| 2,885,953 | 10 | 12 | 54 | 14 | 13 |
|  |  |  | 56 |  |  |
| 2,909,989 | 24 | 19 | 21 | 10 | 16 |
| 2,923,230 | 30 | 38 | 27 | 12 | 16 |

SHORTCOMINGS OF PRIOR ART

Figure 1:
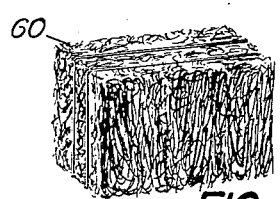

Hay baling machines of the above-described type are quite satisfactory under many conditions, producing a uniformly shaped rectangular bale such as is shown at 60 in FIGURE 1. A bale of rectangular shape or of a square shape is very desirable in that it facilitates tying, handling and storage. Uniformly shaped bales permit the bales to be stacked one upon the other to a considerable height—and in addition are attractive to prospective purchasers because of their symmetry.

Figure 2:
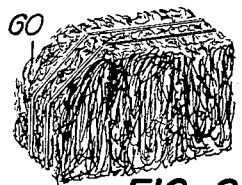
Figure 3:
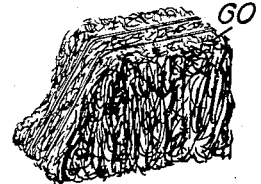

However, under certain adverse conditions it has been found that such machines are less than satisfactory. In particular, when the hay baling machine encounters light or thin windrows, or under certain adverse wet weather conditions, or when the baling machine is moving at a relatively slow speed, the bale of hay which is produced may not be of the precise shape and dimensions desired. Examples of undesirably shaped bales are shown in FIGURES 2 and 3. A bale of hay of nonsymmetrical shape and dimensions not only presents problems in the hay baler itself, but also produces problems after the hay bale has left the baler. For example, wire or twine which passes around the misshapen end of a hay bale is easier to dislodge during normal handling and storage operations. Furthermore, the bales of the shape shown in FIGURES 2 and 3 do not present an attractive sight insofar as prospective purchasers are concerned and accordingly their value is reduced. Such misshapen bales are difficult to stack. Examples of misshapen bales 60 are shown in FIGURES 2 and 3.

OBJECTS

It is therefore a primary object of this invention to provide a hay baling machine which will decrease the occurrence of improperly shaped bales. Another object of this invention is to provide a hay baling machine which will operate under both light windrow conditions and slow speed conditions to produce bales of proper shape and size. These and other objects and advantages will appear after reading the following description taken in conjunction with the attached drawings.

THE DRAWINGS

Figure 4:
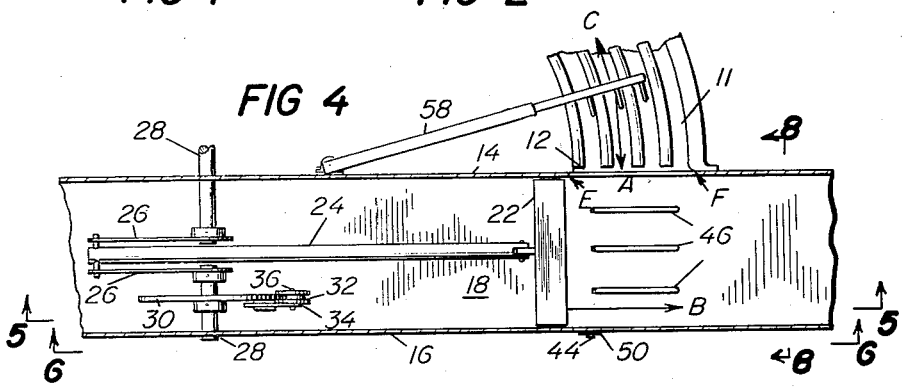
Figure 5:
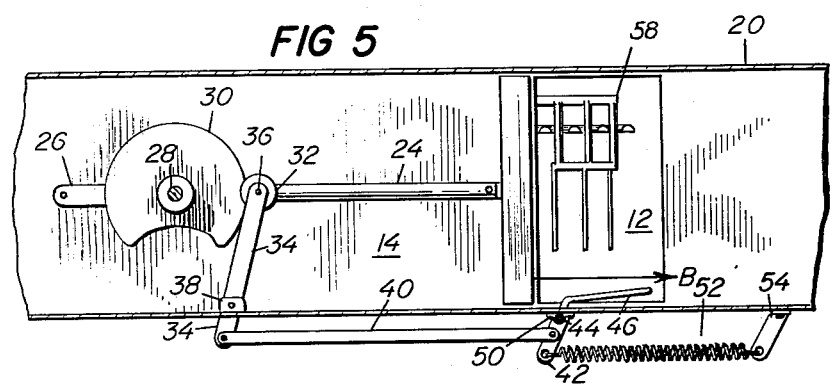
Figure 8:
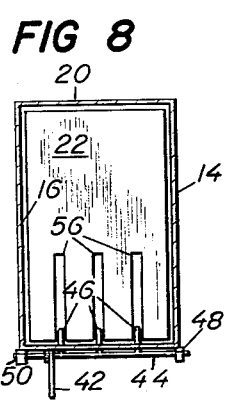
Figure 6:
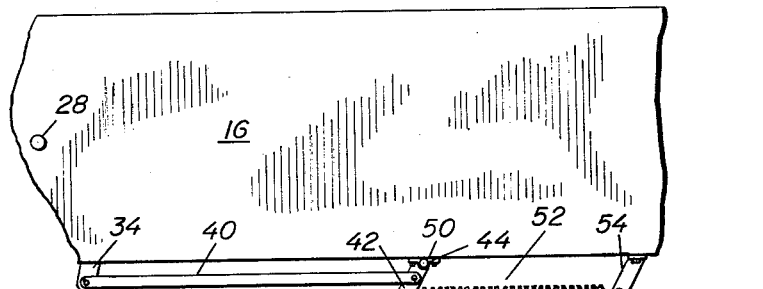

In the drawings:
FIGURES 1, 2 and 3 are perspective views of hay bales;
FIGURES 4 and 9 are plan views of the baling chambers in accordance with this invention;
FIGURE 5 is a view along 5—5 of FIGURE 4;
FIGURE 6 is a view along 6—6 of FIGURE 4;
FIGURE 10 is a view along 10—10 of FIGURE 9;
FIGURE 11 is a view along 11—11 of FIGURE 9;
FIGURE 8 is an end view of FIGURE 4;
FIGURE 7 is an end view of FIGURE 9;
FIGURES 12, 13 and 14 are sequential fragmentary views of how hay is compressed in accordance with this invention.

THE INVENTION BROADLY

In its broadest sense this invention comprises the idea of placing elevating guide means in the baling chamber section of a hay baler, said elevating guide means being designed to position at least a portion of the hay in the baling chamber in a more elevated position with respect to the floor of the baling chamber, so that when such hay is subsequently compressed in the baling chamber a more uniform bale will result.

THE INVENTION MORE SPECIFICALLY

The locus of the mechanical means utilized to effect an improvement in accordance with this invention is the baling chamber section of a conventional hay baling machine, which has been generally designated by the letter D in the earlier part of this description and which is so identified in Table I.

FIGURE 4 is a top view, and FIGURES 5 and 6 are different side views of a hay baling chamber constructed in accordance with this invention. In these figures it will be seen that the baling chamber comprises side walls 14 and 16, a floor 18 and a top 20.

In hay baling machines, and particularly with the hay baling machines described in the eight patents noted earlier, the hay is usually swept into the baling chamber section (D) by a variety of different feeding means— which have also been specifically identified in Table I under the heading (C).

In FIGURES 4 and 5, a feeding means of the type designated as (C) in Table I is indicated by the numeral 58. Feed arm 58 sweeps back and forth in a well known manner (see Patent No. 2,487,938) in the direction indicated by arrows A and C. When feed arm 58 moves in the direction of arrow A, hay is swept from the inlet feed surface 11 into baling chamber. When the feed arm 58 (or any other equivalent feeding means) has reached its inwardmost position and has pushed a load of hay into the baling chamber, the feed arm 58 then begins its return journey (in the direction indicated by arrow C) so as to pick up another load of hay from feed surface 11 (again see Patent No. 2,487,938).

Once a load of hay has been swept into the baling chamber the problem is to compact it into a bale of the desired size and shape. This is accomplished in nearly all balers by a compressing plunger means (e.g. see "E" in Table I). In FIGURES 4 and 5 it will be noted that a compressing plunger 22 is mounted between and within the four walls of the baling chamber. In FIGURES 4 and 5 the compressing plunger 22 is shown in its rearmost position, whereafter it is designed to move forward in its compression stroke in the direction indicated by arrow B. Movement of the compressing plunger 22 is effected by rotation of the drive shaft 28. As will be seen, the drive shaft 28 is journalled in a rotatable yoke member 26 which in turn is connected to a pitman arm 24.

There are numerous ways in which the compressing plunger can be moved within a baling chamber and any such means might be employed. The novelty of this invention does not reside in the discovery of a means for moving the compressing plunger and accordingly the manner in which the shaft 28 is rotated (e.g. by a fly wheel or by a power take-off) is not set forth in detail since it is well known.

The operations described thus far are well known in the art (U.S. Patent No. 2,487,938)—but such operations occasionally produce misshapen hay bales, as previously described.

At the time that feed arm 58 begins its rearward movement in the direction of arrow C, the compressing plunger 22 should be at about its rearmost position as seen in FIGURES 4, 5 and 12, which means that it should be in a position to the left of the letter E in FIGURE 4. In FIGURES 4, 5 and 12 it will also be noted that when the feed arm 58 approaches its innermost position and when plunger 22 approaches its rearmost position, the elevating guide fingers are in a substantially horizontal position. When the elevating guide fingers 46 are in this position they do not present any obstruction to the inward flow of hay being pushed by feed arm 58 in the direction of arrow A and accordingly the hay passes freely from inlet feed surface 11 into the baling chamber feed inlet 12 and generally over the fingers 46 as seen in FIGURES 4, 5 and 12.

In accordance with this invention, it is desirable that the various units of the apparatus move in a definite timed relationship with respect to each other. As the compressing plunger 22 moves in the direction of arrow B it is desirable that the guide fingers 46 come into action. As will be seen in FIGURES 4 through 14, the coordinated raising of elevating guide fingers 46 with the forward movement of compressing plunger 22 is primarily effected by cam 30, cam roller 32, cam tracer 34, linkage 40, lever arm 42 and shaft 44. By the time that compressing plunger 22 reaches the hay which has been fed into the baling chamber by feed arm 58, the guide fingers 46 have risen to the position shown in FIGURES 7, 9, 10 and 13.

The compressing plunger 22 then continues to move forward past the point E (see FIGURES 9 and 10) and to any desired distance beyond this point (see FIGURE 14). The compressing plunger 22 can move over the fingers 46 without any difficulty if the compressing plunger 22 is provided with a plurality of slots 56 of the appropriate size (see FIGURES 7 and 8).

When the compressing plunger 22 has reached its forwardmost position (depending upon the length of yoke 26 and arm 24) the cam 30 is preferably so shaped that the fingers 46 will return to the essentially horizontal position shown in FIGURES 4, 5, 8 and 12. The fingers 46 preferably remain in this horizontal position until the compressing plunger 22 has reached the position shown in FIGURE 4.

It will be noted that the cam roller 32 and the cam tracer 34 will always be urged against the cam surface 30 by virtue of the spring means 52, which has its right end anchored to anchoring member 54 and its left end attached to pivotable lever arm 42. Cam roller 32 is mounted on cam tracer 34 by means of a pin 36. The cam tracer 34 has its lower end in a pivot mount 38 so that the cam tracer is able to move from one position to another along a longitudinal axis of the baling chamber.

The very lowest portion of cam tracer 34 is provided with an adjustable linkage 40 which connects it to a lever arm 42 mounted under a forward position of the baling chamber. Lever arm 42 is rigidly connected to shaft 44, shaft 44 being in turn mounted in a rotatable fashion within bracket supports 48 and 50 (see FIGURES 7 and 8). Rotatable shaft 44 is provided with a plurality of finger-like guide means which extend into the baling chamber.

ADVANTAGES

In summary, the structure of this invention has a number of advantages, as follows:

(A) It improves the shape of hay bales under certain adverse baling conditions,
(B) It improves the over-all performance of the baling chamber,
(C) It improves the over-all appearance and salability of hay bales as compared with the same hay bales which might be produced with prior art machines under certain adverse conditions,
(D) It makes the tying and binding of the hay bales easier and more certain under some conditions,
(E) The string, twine or wire used to bind the hay bale will frequently fit better and will not slip off of the bale due to the improper shape of the end of the bale,
(F) It controls the position of the hay within the baling chamber of a hay baler,
(G) It actually "lifts up" wet hay which would otherwise tend to accumulate near the bottom of the hay baling chamber and which might ordinarily be compressed into an imperfectly shaped hay bale.

The exact position of the elevating guide fingers 46 in the hay baling chamber is not critical. For example, it would involve no invention to move the fingers to the right or to the left, or to have multiple sets of fingers spaced along the length of the hay baler. No invention would be involved in increasing or decreasing the number of fingers in a row and no invention would be involved in shortening or lengthening the fingers or making them of a different shape or configuration than shown. Neither would any invention be involved in linking the elevating guide fingers through a suitable mechanism to the movement of the feed arm 58 rather than to the movement of the compressing plunger.

In conclusion, while the foregoing specification and drawing describe the construction, operation and use of one preferred embodiment of the instant invention, it is to be understood that I do not intend to limit myself to the precise constructions and arrangements herein disclosed, since the various details of construction, form and arrangement may obviously be varied to a considerable extent by anyone skilled in the art without really departing from the basic principles and novel teachings of this invention and without sacrificing any of the advantages of the invention, and accordingly it is intended to encompass all changes, variations, modifications and equivalents falling within the scope of the apended claims.

What is claimed is:

1. An improved hay baling chamber comprising in combination:

(a) top, bottom and side walls,
(b) a plunger longitudinally movable within said chamber, (c) a plurality of elongated finger-like guide means disposed adjacent the floor of said baling chamber,
(d) said plunger being provided with a plurality of vertical slots arranged in the same vertical plane as said elongated finger-like guide means, said slots passing entirely through said plunger,
(e) means for moving said plunger back and forth within said hay baling chamber in a reciprocating manner,
(f) said plurality of elongated finger-like guide means being disposed at an acute angle with respect to the floor of said baling chamber during at least a portion of the reciprocating cycle of said plunger, and
(g) means interconnecting said means for moving said plunger and said plurality of elongated finger-like guide means so that said elongated finger-like guide means will be caused to move upwardly to an inclined position with respect to the bottom of said baling chamber as said plunger starts to move through its compression stroke and said elongated finger-like guide means will be caused to move downwardly to a substantially flat position with respect to the floor of the baling chamber when said plunger moves from its full compression position to its starting position.

2. In a mobile hay baling machine; a feed surface leading to a baling chamber; a feeding means for moving the picked up hay from the feed surface into a baling chamber; a baling chamber section; and means for compressing the hay which is delivered to the baling chamber section, the improvement in said hay baling chamber which comprises:
(a) top, bottom and side walls,
(b) a plunger longitudinally movable within said hay baling chamber by a plunger driving means,
(c) a plurality of elongated finger-like guide means disposed adjacent the floor of said hay baling chamber,
(d) said finger-like guide means being mounted on a common shaft, and
(e) said common shaft being interconnected to a cam means associated with the said plunger driving means so that said elongated finger-like guide means will be caused to move upwardly to an inclined position with respect to the bottom of said baling chamber as said plunger starts to move through its compression stroke and said elongated finger-like guide means will be caused to move downwardly to a substantially flat position with respect to the floor of the baling chamber when said plunger moves from its full compression position to its starting position.

References Cited in the file of this patent

UNITED STATES PATENTS

| 326,579 | Miller | Sept. 22, 1885 |
| 737,729 | France | Sept. 1, 1903 |
| 2,627,714 | Freeman et al. | Feb. 10, 1953 |

FOREIGN PATENTS

| 1,055,029 | France | Oct. 14, 1953 |
| 289,460 | Germany | Dec. 28, 1915 |
| 668,477 | Germany | Dec. 3, 1938 |